Feb. 8, 1949.   P. J. WALSH   2,461,133
ELECTRIC POWER SYSTEM
Filed Dec. 6, 1943

INVENTOR
Philip J. Walsh.

Patented Feb. 8, 1949

2,461,133

UNITED STATES PATENT OFFICE 2,461,133

ELECTRIC POWER SYSTEM

Philip John Walsh, San Francisco, Calif., assignor, by direct and mesne assignments, to Agency Electric Co., San Francisco, Calif., a limited partnership Application December 6, 1943, Serial No. 513,153

8 Claims. (Cl. 175—363)

This invention relates to a system for converting alternating current into direct current.

In my Patents Nos. 2,199,121 and 2,329,021 I describe systems for the conversion of alternating current into direct current by means of reactors and transformers.

It is an object of this invention to improve the systems described in my prior patents.

It is another object of this invention to provide separate paths for the load current and the magnetizing current through the circuit elements.

It is still another object of this invention to provide a half wave converter system having no alternating current component flowing in the direct current load circuit.

My invention possesses many other advantages and has other objects which may be made more easily apparent from a consideration of one embodiment of my invention. For this purpose, I have shown a few forms in the drawing accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawing.

Figure 1:
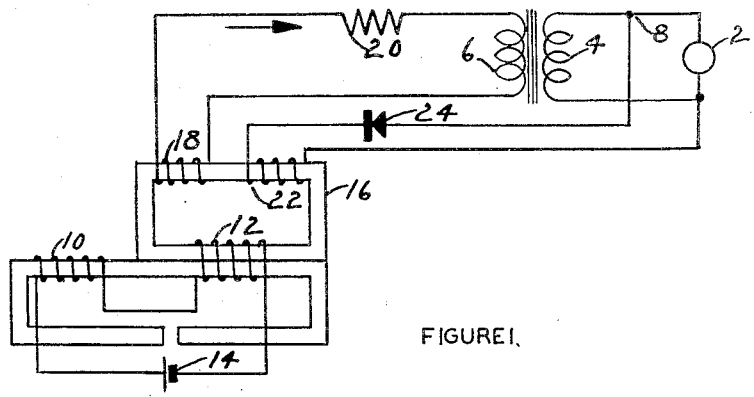
Figure 1 is a schematic wiring diagram of one form of my invention.

In Figure 1, I show a source of alternating current 2 connected to the primary winding 4 of a transformer having the secondary winding 6. The coils 10 and 12 connected to the battery 14 serve to magnetically saturate the core 16 and to prevent the flow of induced currents through the battery circuit in the manner set forth in my Patent No. 2,329,021.

Since the core 16 is practically saturated by the current flowing through the coil 12, it is seen that when current flows from the lower end of the coil 6, through coil 18 and load 20 to the upper end of coil 6, in the direction of the solid arrow, that the current through coil 18 tends to further magnetize the saturated core. Therefore, the coil 18 offers substantially no opposition to current flow in that direction. During this part of the cycle no current can flow from the source 2 through the coil 22 due to the action of the rectifier 24, and no voltage is induced in the coil 22 by the current flowing in the coil 18, since the core 16 is saturated.

During the other part of the cycle when the voltage across the coil 6 is in the opposite direction, current flows from point 8 through the rectifier 24, coil 22, and back to the source 2 in a direction through coil 22 tending to demagnetize the core 16. The change in flux density through the core 16 caused by this current induces an electromotive force in the coil 18 by transformer action that is equal to, and opposed to, the electromotive force impressed on the coil 18 by the secondary coil 6. Since these forces are equal and opposite, no current can flow from the coil 6 through the load 20 during this part of the cycle. If the electromotive force induced in the coil 18 is made greater than the electromotive force across the coil 6, current flows from the coil 18 as a source of current in the direction of the arrow through the load 20 and coil 6, thus tending to produce full wave rectification. The system can be operated in that manner if desired.

The rectifier 24 can be a very small unit since the main load current does not flow through it, but only the magnetizing or control current passes through it. Another advantage is that in a high voltage system, the circuit including the rectifier 24 operates at low voltage. The rectifier 24 can be of any type and in connection with Figure 2, I will explain how the magnetic type can be employed for this purpose.

Figure 2:
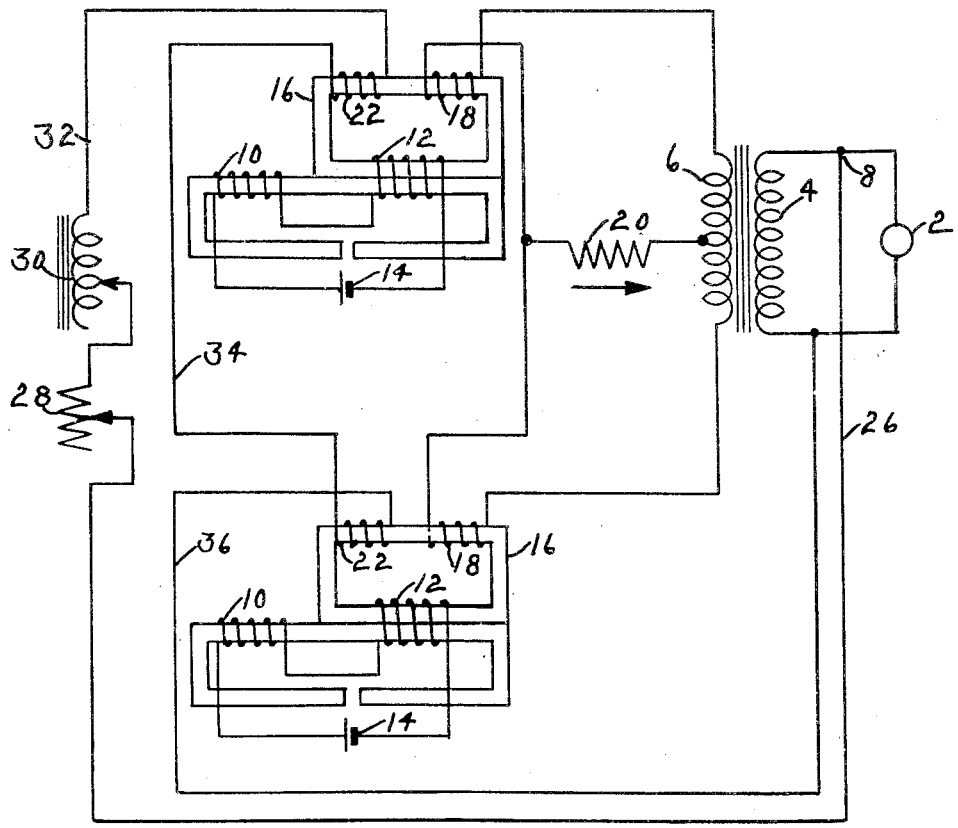
Figure 2 is a wiring diagram of another form of my invention in which magnetic type rectifiers are employed for full wave conversion.

Referring to Figure 2, two magnetic units such as that shown in Figure 1 are arranged to provide a full wave converter system. The coils 10 and 12 and the batteries 14 operate to practically saturate the cores 16 as was described in connection with Figure 1. Separate batteries are shown merely to simplify the drawing, as all the coils 10 and 12 can be connected in series and to a single battery if desired.

The alternating current source 2 is connected to the primary 4 of a transformer having the secondary coil 6. When the upper end of the coil 6 is positive and its lower end negative, the point 8 is also positive relative to the other side of the source 2. During a part of the cycle, current flows from point 8 over conductor 26, through the phase changer elements, resistor 28 and coil 30, conductor 32, through the upper coil 22, conductor 34, through the lower coil 22, then by way of conductor 36 back to the source 2. The direction of current flow through the upper coil 22 is such as to tend to further magnetize the saturated upper core 16, while in the lower coil 22 it flows in the opposite direction and tends to demagnetize the lower core 16. At the same time load current flows from the upper end of coil 6, through coil 18 in a direction tending to further magnetize the core 16, and through load 20 to the center tap on coil 6 in the direction of the solid arrow. By proper adjustment of the phase changer elements 28 and 30, no current can flow through the lower coil 18 since the flux change in the core 16 induces an electromotive force in the lower coil 18 that is at any instant equal and opposite to the applied voltage.

During the remainder of the cycle when the lower end of the coil 6 is positive, load current flows through the lower coil 18 and load 20 in the direction of the solid arrow, while an equal and opposite electromotive force is induced in the upper coil 18 by the current flow through the upper coil 22 and thus prevents the flow of current through the upper coil 18.

It thus comes about that the control current passes through the coils 22 and causes a flux change in the cores 16, one core at a time, to induce opposing voltage in the coils 18, one coil at a time, to prevent the flow of current through one of the coils 18 while while allowing load current to flow unopposed through the other coil.

The coils 18 and 22 can be placed at right angles to each other by winding them on different legs of the core 16.

I claim:

1. The method of converting alternating current from a source of alternating-current voltage to direct current in a circuit on which an alternating-current voltage is impressed, comprising passing alternate half cycles of current through said circuit in response to alternate half cycles of said impressed alternating-current voltage, and during each intermediate half cycle of said impressed alternating-current voltage, introducing a half cycle of voltage of substantially similar wave shape and duration, into said circuit at another point and in phase opposition thereto.

2. A system for converting alternating current from a source of alternating-current voltage, to direct current in a circuit on which an alternating-current voltage is impressed, comprising an auxiliary circuit including means for applying to said first circuit, spaced half cycles of alternating-current voltage of substantially the same amplitude and duration as half cycles of said impressed voltage but in phase opposition to alternate half cycles of said impressed voltage.

3. The method of converting alternating current from a source of alternating-current voltage, to direct current in a circuit on which an alternating-current voltage is impressed, comprising passing alternate half cycles of current through said circuit in response to alternate half cycles of said impressed alternating-current voltage, and on each intermediate half cycle of said impressed alternating-current voltage, deriving a half cycle of voltage of substantially the same wave shape and duration, and introducing the same in said circuit at another point and in phase opposition thereto.

4. A system for converting alternating current from a source of alternating-current voltage to direct current in a circuit on which an alternating-current voltage is impressed, comprising an auxiliary circuit connected to said source of alternating-current voltage and including means for applying to said first circuit, spaced half cycles of alternating-current voltage of substantially the same amplitude and duration as alternate half cycles of said impressed voltage but in phase opposition thereto.

5. In combination, a source of alternating-current voltage, a load circuit coupled thereto and including a coil having an initially saturated core whereby intermediate half cycles of current causing a diminution of saturation in said core are thereby partially suppressed, and an auxiliary circuit connected to said source and including a winding coupled to said coil and a rectifier in series with said winding, for introducing into said load circuit, spaced half cycles of voltage of substantially the same amplitude as the voltage impressed thereon from said source but in phase opposition to alternate half cycles of said impressed voltage.

6. In combination, a source of alternating-current voltage, a load circuit coupled thereto and including a coil having an initially saturated core whereby intermediate half cycles of current causing a diminution of saturation in said core are thereby partially suppressed, and an auxiliary circuit connected to said source and including a winding on said core in a direction to further diminish the saturation of said core during such intermediate half cycles whereby said winding and said coil are magnetically coupled during the period of such intermediate half cycles, said winding and coil when coupled constituting transformer means for introducing into said load circuit, a voltage of substantially the same amplitude as the voltage impressed thereon from said source but in phase opposition thereto.

7. The method of converting alternating current from a source of alternating-current voltage, to direct current in a circuit on which an alternating-current voltage is impressed, to obtain the equivalent of fuel wave rectification, comprising passing alternate half cycles of current through said circuit in response to alternate half cycles of said impressed alternating-current voltage, and during each intermediate half cycle of said impressed alternating-current voltage, introducing a half cycle of voltage into said circuit of greater amplitude than said impressed voltage and in phase opposition to alternate half cycles of said impressed voltage.

8. A system for converting alternating current from a source of alternating-current voltage, to direct current in a circuit on which an alternating-current voltage is impressed, comprising an auxiliary circuit including means for applying to said first circuit, spaced half cycles of alternating-current voltage of substantially the same duration but greater amplitude than said impressed voltage and in phase opposition to alternate half cycles of said impressed voltage.

PHILIP JOHN WALSH.

REFERENCES CITED

The following references are of record in the file of this patent:

UNITED STATES PATENTS

| Number | Name | Date |
|---|---|---|
| 413,353 | Telsa | Oct. 22, 1889 |
| 846,672 | Koch | Mar. 12, 1907 |
| 1,281,673 | Seeley | Oct. 15, 1918 |
| 2,142,837 | Edwards | Jan. 3, 1939 |
| 2,199,121 | Walsh | Apr. 30, 1940 |
| 2,329,021 | Walsh | Sept. 7, 1943 |